United States Patent [19]

Kawada et al.

[11] Patent Number: 5,086,361
[45] Date of Patent: Feb. 4, 1992

[54] ROTARY HEAD DRUM FOR VIDEO TAPE RECORDER

[75] Inventors: Hideaki Kawada; Yoshiaki Sugiyama; Masahiro Kanaguchi, all of Kanagawa, Japan

[73] Assignee: Sony Corporation, Tokyo, Japan

[21] Appl. No.: 507,736

[22] Filed: Apr. 12, 1990

[30] Foreign Application Priority Data

Apr. 21, 1989 [JP] Japan .................. 1-103238

[51] Int. Cl.$^5$ .................. G11B 5/52; G11B 21/04
[52] U.S. Cl. .................. 360/107
[58] Field of Search .................. 360/107, 130.24

[56] References Cited

U.S. PATENT DOCUMENTS

| 4,408,239 | 10/1983 | Ushiro | 360/107 |
| 4,654,738 | 3/1987 | Kato et al. | 360/130.24 |
| 4,706,143 | 11/1987 | Asada et al. | 360/107 |

*Primary Examiner*—Robert S. Tupper
*Attorney, Agent, or Firm*—Alvin Sinderbrand; William S. Frommer

[57] ABSTRACT

A rotary head drum for a video tape recorder includes a stationary lower drum member having a base portion and inner and outer cylindrical portions extending generally upwardly from the base portion to define an internal cavity therebetween. A rotary assembly is rotatably mounted on a rotor shaft coaxial with the lower drum member and has at least one rotary magnetic head mounted thereto for recording digital signals on and reproducing the signals from a magnetic tape wrapped about the drum. A motor for driving the rotary heads, a rotation detector or tach generator for detecting the rotation of the motor, and a multi-channel rotary transformer for transferring digital signals to and from the rotary head are all housed in the cylindrical internal cavity surrounded by the base portion, and inner and outer cylindrical portions of the lower drum member which thereby reduces the overall axial height of the video tape recorder.

20 Claims, 5 Drawing Sheets

ROTARY HEAD DRUM FOR VIDEO TAPE RECORDER

BACKGROUND OF THE INVENTION

1. Field of the Invention

The present invention relates generally to a portable type video tape recorder (VTR), and more particularly, to a rotary head drum for a video tape recorder (VTR) which reduces the axial height of the VTR.

2. Description of the Prior Art

Figure 1:
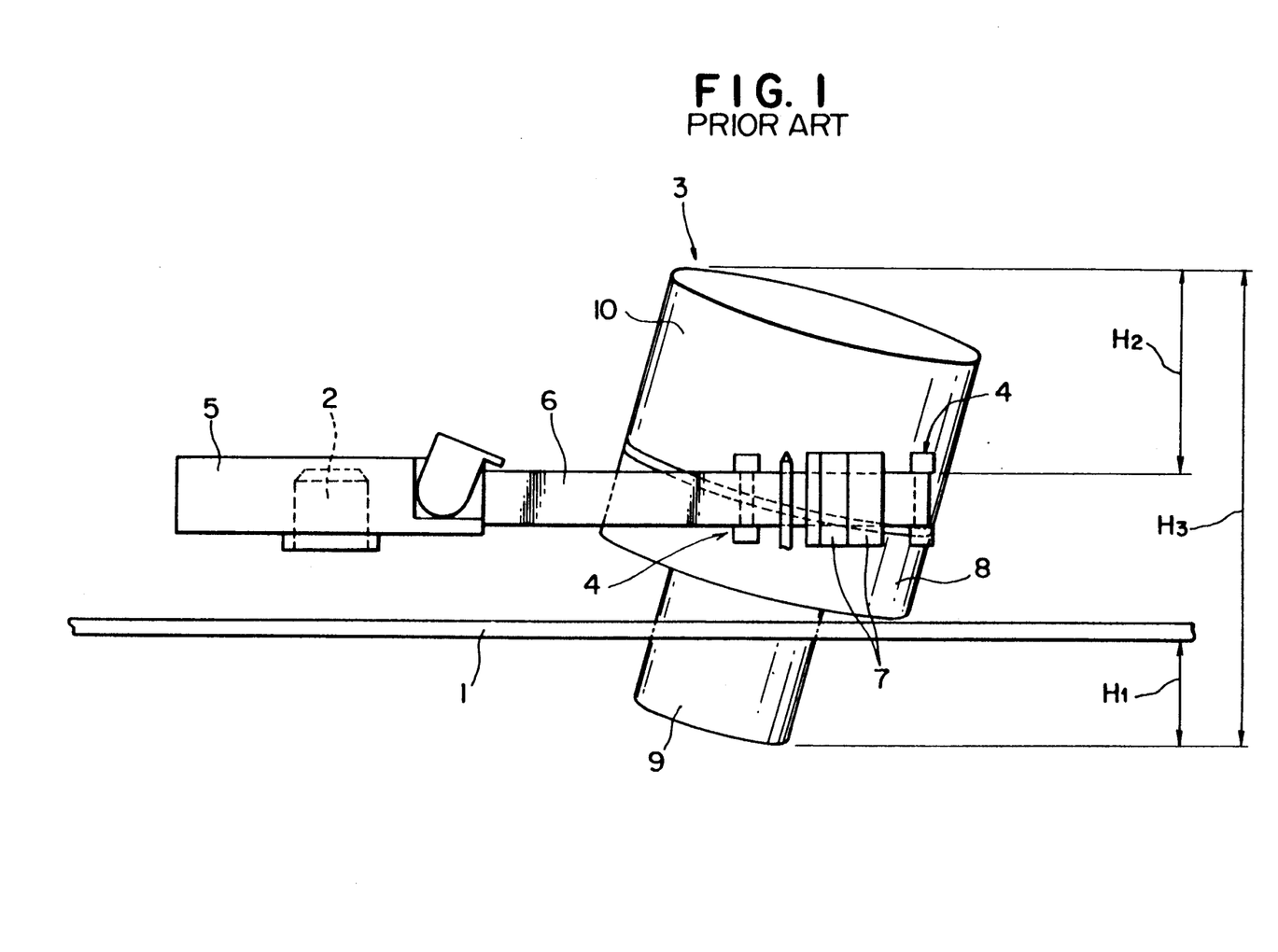
FIG. 1 is a front elevational view showing an example of a tape transport assembly for a portable VTR employed according to the prior art.

FIG. 1 shows an example of a tape transport assembly for loading magnetic tape around a head drum in a portable VTR according to the prior art. This tape transport assembly includes a pair of reel tables 2, a rotary head drum 3 mounted on a chassis 1 with a predetermined inclination, and a plurality of tape loading devices 4 which are movable around the rotary head drum 3. In such a tape transport assembly, a tape cassette 5 housing magnetic tape 6 is placed generally horizontally on the reel tables 2. The magnetic tape 6 is withdrawn from the tape cassette 5 by the tape loading devices 4 and then guided around the rotary head drum 37 such that video signals may be recorded on and/or reproduced from the tape by rotary heads (not shown) associated with the drum. Additionally, as shown in FIG. 1, a stationary audio head 7 is positioned adjacent to the head drum 3, for recording and/or reproducing audio signals from the tape.

Alternatively, stationary-type digital VTRs are known, primarily for professional or studio use, and which are adapted to record and/or reproduce digital signal information. In the rotary head drum used in such known stationary-type digital VTRs, a rotary disc having a multi-channel rotary head is interposed between stationary upper and lower drums, and a rotary-head driving motor is disposed below the lower drum. Although such a digital VTR is capable of high-density information recording and reproduction, a multi-channel rotary magnetic head mounted on the rotary head drum is required. As a consequence thereof, a multi-channel rotary transformer for transferring the digital signals to and from the rotary head is also required. Furthermore, the axial length of the upper drum member in such digital VTRs has been at least twice as long as that of the lower drum member in order to incorporate therein a multi-channel rotary transformer.

However, when this rotary head drum designed for use in the stationary-type digital VTR is incorporated within the conventional portable VTR shown in FIG. 1, the motor 9 disposed under the lower drum 8 secured on the chassis 1 projects below the chassis by an axial height Hl. Furthermore, the upper drum 10 which is designed to have at least twice the axial height of the lower drum projects above the magnetic tape 6 by an axial height H2. Accordingly, incorporating the known rotary head drum of the stationary-type digital VTR into the conventional portable VTR results in an unacceptably large axial height H3 of the VTR so that it is not truly or reasonably portable.

OBJECTS AND SUMMARY OF THE INVENTION

Accordingly, it is an object of the present invention to provide an improved rotary head drum for a portable video tape recorder (VTR) which can avoid the above problems encountered with the prior art.

More specifically, it is an object of the present invention to provide a rotary head drum for a portable VTR which reduces the overall axial height of the VTR.

It is also an object of the present invention to provide a rotary head drum for a portable VTR wherein the rotary head driving motor does not extend below the chassis supporting the lower drum member of the rotary head drum.

It is a further object of the present invention to provide a rotary head drum for a portable VTR wherein the rotary head driving motor, motor rotation detector or tach generator, and rotary transformer are all incorporated within a lower drum member of the portable VTR in such a way as to reduce the overall axial height of the VTR.

These and other objects are accomplished in accordance with an aspect of the present invention by providing a rotary head drum including a stationary lower drum member having a base portion and inner and outer cylindrical portions extending generally upwardly from the base portion which define an internal cavity therebetween. A rotary assembly is rotatably mounted on a rotor shaft coaxial with the lower drum member and has at least one rotary magnetic head mounted thereto for recording digital signals on and/or reproducing digital signals from a magnetic tape which is wound around the rotary head drum, and a rotary head driving motor, a motor rotation detector or tach generator and a rotary transformer are all incorporated within the internal cavity of the lower drum member under the rotary assembly to thereby reduce the overall axial height of the portable VTR.

The rotary head driving motor includes a plurality of stator coils fixedly secured onto the lower drum member, and a rotor magnet rotatably secured to the rotary assembly within the internal cavity inwardly and oppositely disposed to the stator coils in the radial direction of the lower drum member.

In accordance with a feature of this invention, the motor rotation detector or tach generator includes a pattern plate secured to the lower drum member which has a pole generating FG pattern on its upper surface, and a polar magnet rotatably mounted on the rotary assembly opposite to the pole generating FG pattern plate.

The rotary transformer includes stationary cores secured in multiple vertical steps to the lower drum member, and rotary cores secured in multiple vertical steps to the rotary assembly opposite to the stationary cores. Both the rotor magnet of the motor and the polar magnet of the rotation detector are disposed within the internal cavity outwardly of the rotary cores of the rotary transformer.

The above, and other objects, features and advantages of the present invention, will become apparent in the following detailed description of a preferred embodiment which is to be read in conjunction with the accompanying drawings, and in which like reference numerals are used to identify the same or similar parts in the several views.

DETAILED DESCRIPTION OF A PREFERRED EMBODIMENT

Figure 2:
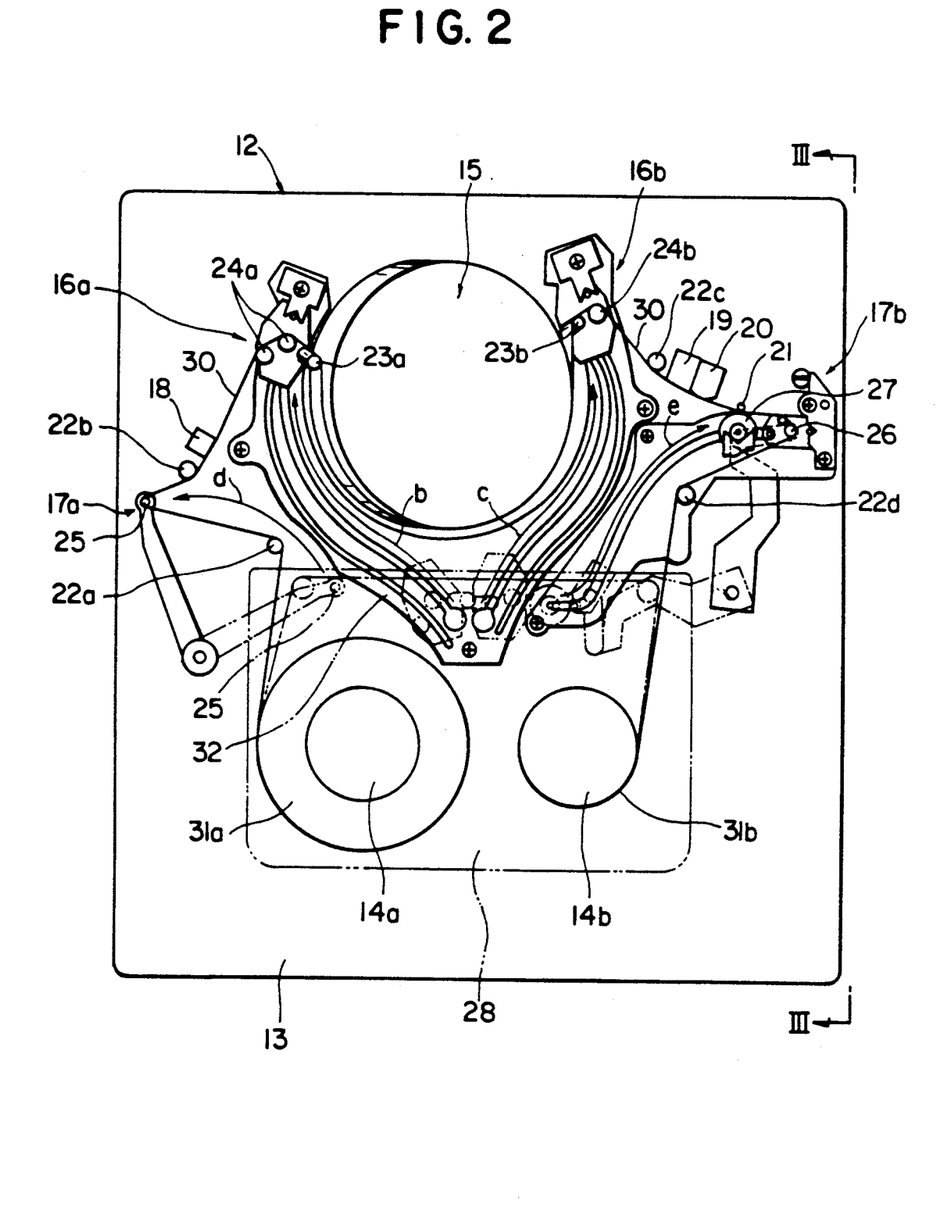
FIG. 2 is a top plan view of the tape transport assembly for the portable digital VTR of the present invention.
Figure 3:
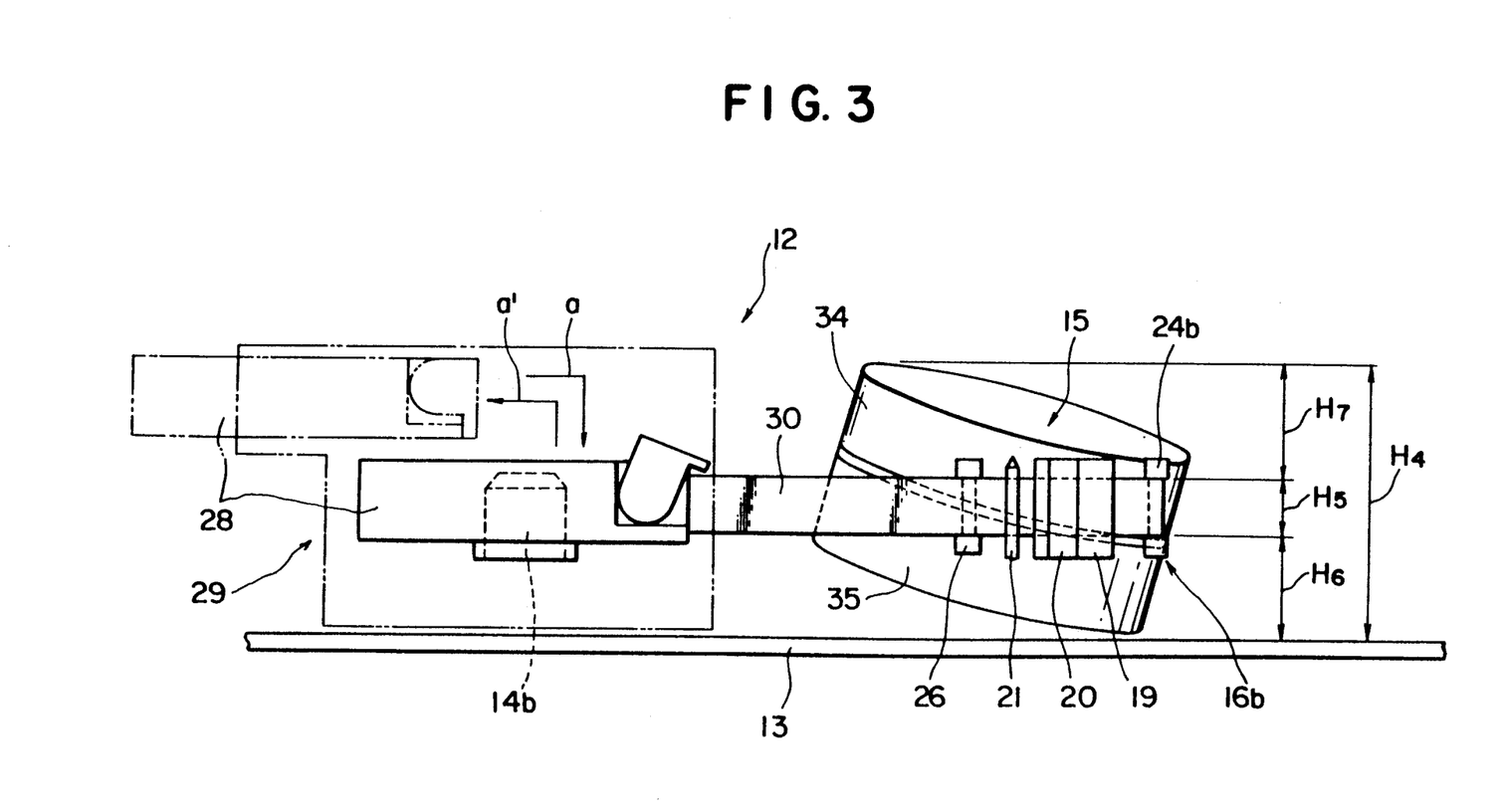
FIG. 3 is a side elevational view taken along line III—III of FIG. 2.

Referring initially to FIGS. 2 and 3, a tape handling device 12 which performs a tape loading operation and then transports the tape during a signal recording/reproducing operation in a portable helical-type digital VTR is illustrated. The following elements of the tape handling device 12 are mounted on a chassis 13; namely: supply and take-up reel tables 14a and 14b, respectively; a rotary head drum 15 having a predetermined inclination; a plurality of tape loading devices including a pair of main loading members 16a, 16b and a pair of auxiliary loading members 17a, 17b; a plurality of stationary heads including a full width erasing head 18, an audio head 19 and a CTL head 20; a capstan 21; and a plurality of tape guide members 22a-22d. The main loading members 16a, 16b include guide blocks having oblique guide members 23a, 23b and tape guide members 24a, 24b, respectively. The auxiliary loading member 17a on the tape supply side (S side) includes a tension detecting pin 25, while the auxiliary loading member 17b on the tape take-up side (T side) includes a guide block supporting a tape guide roller 26 and a pinch roller 27.

A cassette holder assembly 29 is mounted on the chassis 13 and is operable to load a tape cassette 28 or eject the same from the two reel tables 14a, 14b. In each tape cassette 28, magnetic tape is wound around a pair of reels 31a, 31b. The cassette holder assembly 29 displaces the tape cassette 28 in the directions of arrows a, a' (FIG. 3) along a substantially L-shaped path between a cassette inserting position, as shown by the dotted lines in FIG. 3, and a cassette mounting position, as shown by the solid lines in FIG. 3.

As illustrated by the solid line in FIG. 3, the reels 31a and 31b of tape cassette 28 are initially loaded on the two reel tables 14a, 14b by the cassette holder mechanism 29 in the direction of arrow a such that the tape cassette is loaded in a generally horizontal orientation. In this cassette loaded position, the pair of main loading members 16a, 16b and the pair of auxiliary loading members 17a, 17b are conventionally moved rearwardly to the respective positions shown in dot-dash lines on FIG. 2 such that they are inserted in a front opening 32 of the tape cassette 28 and positioned adjacent to the rear surface 33 of the magnetic tape. Thereafter, the main loading members 16a, 16b and the auxiliary loading members 17a, 17b are displaced along respective guide grooves in the directions of arrows b, c, d, and e, respectively, to their operative positions as represented by the solid lines in FIG. 2. In response to such displacements of the loading members 16a, 16b, 17a and 17b the magnetic tape 30 is withdrawn from the tape cassette 28 and travels in a predetermined path defined by the full-width eraser head 18, audio head 19, the rotary head drum 15 (about which the tape is spirally wrapped in substantially an M-shape therearound), CTL head 20, capstan 21 and tape guide members 22a-22b. When a recording and/or reproducing command signal is received after the tape is so loaded, the tape 30 is pressed against the rotated capstan 21, by the pinch roller 27 on the T-side auxiliary loading member 17b. The magnetic tape from the supply reel 31a of the tape cassette 28 is then moved along the predetermined tape path and is rewound around the take-up reel 31b and a digital video signal is recorded on or reproduced from the magnetic tape by a multi-channel rotary head of the rotary head drum 15. Additionally, audio signals may be recorded on or reproduced from the magnetic tape by the audio head 18 as the tape travels past the rotary head drum 15.

The construction of the rotary head drum 15 in accordance with an embodiment of this invention will now be explained with reference to FIG. 4.

The rotary head drum 15 is mounted onto the chassis 13 with a predetermined inclination relative to the latter. The rotary head drum 15 includes a stationary upper drum member 34, a stationary lower drum member 35 substantially equivalent in diameter to the upper drum member 34, and a rotary assembly 37. The stationary lower drum member 35 includes a base portion 35a and outer and inner cylindrical portions 35b and 35c, respectively, extending generally upwardly from the base portion. The area between the inner and outer cylindrical portions defines a lower internal cavity 51a. As shown in FIG. 4, the inner cylindrical portion 35c is disposed adjacent to a rotor shaft 46 on which the rotary assembly 37 is mounted.

The upper drum member 34 includes a top member 34a and a cylindrical flange member 34b depending downwardly from the top portion 34a for defining an upper internal cavity 51b therebetween. The upper drum member 34 is secured to the lower drum member 35 by a plurality of fasteners 45 extending through a drum holder 44 and fixedly attaching the latter to the outer cylindrical portion 35b of the lower drum 35 and the downwardly depending flange member 34b of the upper drum member 34.

The base portion 35a of the lower drum 35 is anchored by a plurality of fasteners 42 onto a drum table 41 which extends from the chassis 13 with a predetermined inclination.

In order to record digital signals on and/or reproduce digital signals from the magnetic tape, the rotary assembly 37 includes at least one multi-channel rotary magnetic head 36 which is attached to the peripheral surface of a rotary disc 39. The rotary disc 39 is anchored to a mating surface on a flange 39a of a rotary hub 38 by a plurality of fasteners 40, and the hub 38 is rotatably mounted on the rotor shaft 46. The lower end 46a of the rotor shaft 46 is rotatably supported by a lower ball bearing 47a attached to the drum table 41 and an upper end portion of the shaft 46 is rotatably supported by an upper ball bearing 47b housed within an upper end portion 81 of the inner cylindrical portion 35c of the lower drum member 35. The center of the rotary hub 38 of the rotary assembly 37 is anchored to the upper end 82 of the rotor shaft 46 by means of a fastener 48 and a nut 49, such that the rotary head or heads 36 can be moved along a circular path extending through a slit 43 formed between the upper and lower drum members 34 and 35.

In accordance with an aspect of the present invention the overall axial height of a portable VTR can be significantly reduced by the design of the rotary head drum 15. As illustrated in FIG. 4, a motor 52 for driving the rotary head(s) 36, a rotation detector or tach generator (FG) 53 for detecting the rotation of the motor 52, and a multi-channel rotary transformer 54 for transferring digital or other signals to and from the multi-channel rotary head(s) 36 are all housed in the cylindrical lower internal cavity 51a surrounded by the base portion 35a and the outer and inner cylindrical portions 35b and 35c of the lower drum member 35.

The motor 52 for driving the rotary heads is of an iron core type and includes a plurality of stator coils 58 secured onto the base portion 35a of the lower drum member by a plurality of fasteners 57 extending through an insulated cylindrical stator holder 56. The stator coils are supported generally parallel to the base portion 35a of the lower drum member 35. The motor 52 also includes a cylindrical rotor magnet 63 which is rotatably secured under a flange of the rotor assembly hub-38 by a plurality of fasteners 62 extending through an insulated cylindrical rotor holder 61. The rotor holder 61 is formed of a pair of outwardly extending arms 61a and 61b which receive and retain the rotor magnet 63 therebetween in a generally vertical orientation. In this motor configuration, the stator coils 58 and the rotor magnet 63 are oppositely disposed to each other, in the radial direction of the lower drum member 35, within the cavity 51a.

The rotation detector 53 for detecting the rotation of the motor includes a pattern plate 65 having a pole generating FG pattern 64 on its upper surface, and a cylindrical multi-pole polar magnet 66. The pattern plate 64 is secured to the base portion 35a by the fasteners 57 through the stator holder 56 such that the plate 64 abuts against the base portion 35a generally parallel thereto. The polar magnet 66 is suitably secured between the outer surface of the lower end of the hub 38 and the lower end of the rotor holder 61 and is thus rotatably mounted on the rotary assembly 37 opposite to the pole generating FG pattern plate 64. The rotation of the polar magnet 66 past the conductor pattern on plate 64 generates FG pulses by which the rotational speed an phase of the head on heads 36 can be detected.

The multi-channel rotary transformer 54 for transferring digital or other signals to and from the multi-channel rotary head(s) 36 includes stationary cores 67 secured in multiple vertical steps to the outer peripheral surface 83 of inner cylindrical portion 35c of the fixed lower drum member 35, and rotary cores 68 secured in corresponding multiple vertical steps to the inner peripheral surface 84 of the cylindrical wall 38a of the rotary hub 38. In this structure, the stationary and rotary cores 67 and 68, respectively, are disposed radially opposite each other at their outer and inner peripheral surfaces.

Figure 4:
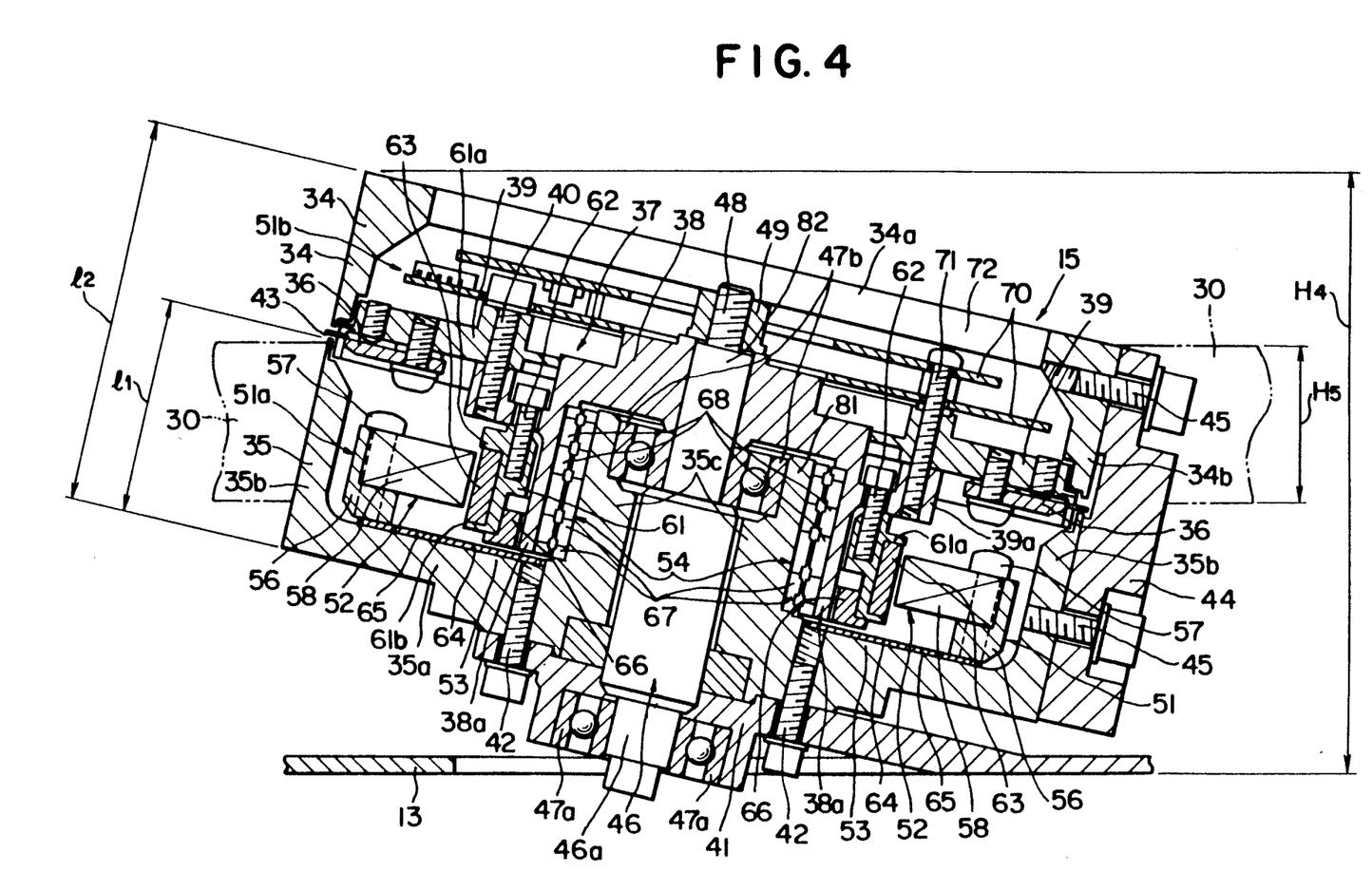
FIG. 4 is an enlarged front cross-sectional view of the rotary head drum utilized in the portable VTR of FIGS. 2 and 3.

As is further shown in FIG. 4, the rotary head drum 15 includes a plurality of circular printed circuit boards 72 on which recording/reproducing amplifiers or the like are mounted. The boards 70 are secured onto the rotary disc 39 by fasteners 71, in the upper internal cavity 51b defined by the downwardly depending flange member 35b of the upper drum member 34. The boards 70 are mounted generally parallel to the top member 35a of the upper drum member and to the top of hub 38 and rotary disc 39 of the rotary assembly 37. The stationary cores 67 of the rotary transformer 54 are connected to a circuit (not shown) in the stationary lower drum member, and the rotary cores 68 are connected to the rotary heads 36 through the pre-amplifiers or the like on the circuit boards 70.

With the rotary head drum 15 being thus constructed, the rotary assembly 37 is rotated by the rotary motor 52 which in turn drives the rotary head or heads 36 in the slit 43 between the lower and upper internal cavities 51a and 51b. The rotational speed phase of the polar magnets 66 of the rotation detector driven together with the rotor magnet 63 are then detected with reference to electrical signals produced by the FG pattern 64 of the pattern plate 65. Simultaneously, digital or other signals to be recorded by the rotary head 36 are transferred between the rotary cores 68 and the stationary cores 67 of the rotary transformer 54.

According to this preferred embodiment, the stator coils 58 and the rotor magnet 63 of the motor 52 are so disposed within the lower internal cavity 51a so as to be opposite to each other in the radial direction of the lower drum member. Additionally, the rotor magnets 63 of the motor 52 and the polar magnet 66 of the rotation detector 53 ar disposed within the lower internal cavity 51a outwardly of the rotary cores 68 of the rotary transformer. Accordingly, the motor 52, the rotation detector 53 and the rotary transformer 54 can all be housed compactly in the internal cavity 51 without increasing the axial length L1 of the lower drum member.

Due to this rotary head drum design, the total length L2 of the rotary head drum can be reduced to 45 mm and this inclined total height can be reduced to 80 mm, with the magnetic tape 30 having a vertical width H5 of 19 mm.

Consequently, the tape handling device 12 incorporating such a rotary head drum 15 is capable of compactly housing all of the component elements, which are required to perform a tape loading operation and a signal recording/ reproducing operation such that the overall axial height H4 of the rotary head drum 15, is significantly reduced as illustrated in FIG. 3. Since the overall axial height H4 of the tape handling device 12 is substantially determined by that of the rotary head drum 15, a significant reduction of the overall axial height H4 of the tape transport mechanism 12 is also achieved.

As illustrated in FIG. 3, the magnetic tape 30 is discharged horizontally from the tape cassette 28 substantially at the mid-point of the total axial height H4 of the tape handling device 12 and is then loaded along a predetermined path as aforedescribed. Accordingly, the height H6 below the magnetic tape 30 in the tape handling device 12 can be utilized for housing the tape loading members 16a, 16b, and auxiliary loading members 17a, 17b, and also the driving components such as the two reel tables 14a, 14b. The axial height H7 above the magnetic tape 30 in the tape handling device 12 can be utilized for mounting or ejecting the tape cassette 28 from the two reel tables 14a, 14b.

Figure 5:
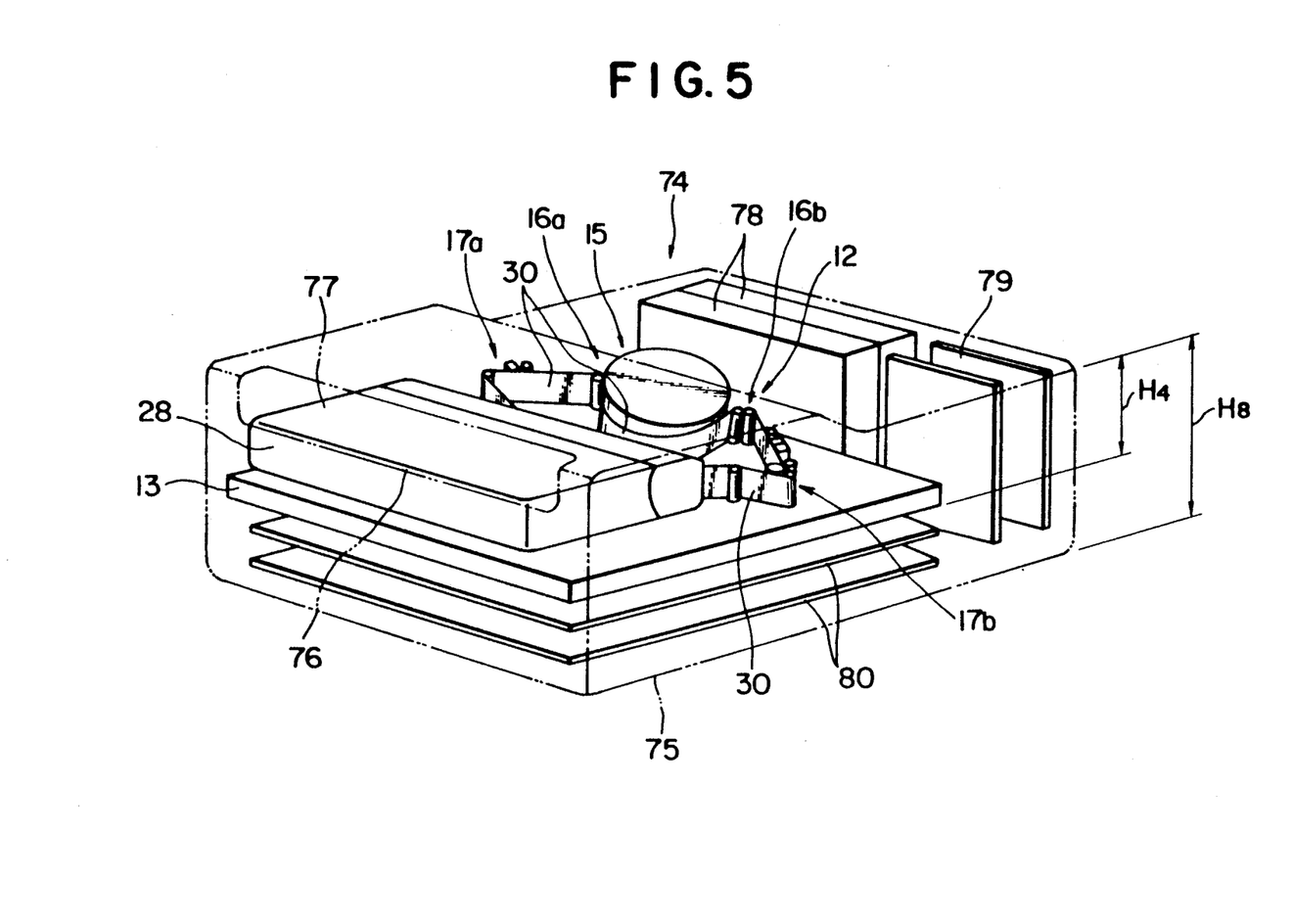
FIG. 5 is a front perspective view of a portable digital VTR utilizing the rotary head drum of FIG. 4.

Since the total height H4 of the tape handling device 12 is thus reduced, the total axial height H8 or thickness of a portable digital VTR 74 incorporating such device 12 is likewise reduced, as is illustrated in FIG. 5. In this portable digital VTR 74, a cassette insertion aperture 76 is formed in an upper front end portion of cabinet 75. This aperture 76 permits horizontal insertion of the tape cassette 28 therethrough to the operating position of the cassette holder mechanism 29. After the tape cassette is inserted, an outwardly openable lid 77 can close the aperture 76. A battery pack 78 and a power supply circuit board 79 are housed in the cabinet 75 behind the tape handling device 12, and various signal processing and control circuit boards 80 are mounted beneath the tape handling device 12.

Although a preferred embodiment of the invention has been described in detail with reference to the accompanying drawings, it is to be understood that the present invention is not limited to that precise embodiment, and that many changes and modifications could be affected therein by one skilled in the art without departing from the spirit and scope of the invention as defined in the appended claims.

We claim:

1. A rotary magnetic head drum for guiding a magnetic tape in a helical-type video tape recorder during the recording or reproducing of signals on the tape, said rotary magnetic head drum comprising:
   a stationary lower drum member having a base portion and inner and outer cylindrical portions extending generally upwardly from said base portion for defining an internal cavity therebetween;
   a rotary assembly rotatably mounted on a rotor shaft coaxial with said lower drum member and having at least one rotary magnetic head mounted thereto for recording signals on and reproducing signals from the magnetic tape;
   driving means for driving said at least one rotary head and being mounted in said internal cavity of said lower drum member;
   means for transferring signals to and from said at least one rotary head and also being disposed within said internal cavity in radially spaced, and axially overlapped relation to said driving means to thereby reduce the axial height of the video tape recorder; and
   means for detecting rotation of said driving means and being also disposed within said internal cavity at least partly in radially spaced, and axially overlapped relation to said driving means to thereby reduce the axial height of the video tape recorder.

2. The rotary magnetic head drum as set forth in claim 1, wherein said driving means includes a motor having a plurality of stator coils fixedly secured to said lower drum member, and a rotor magnet rotatably secured to said rotary assembly inwardly of said stator coils.

3. The rotary magnetic head drum as set forth in claim 2, wherein said stator coils and said rotor magnet are oppositely disposed to each other in the radial direction of said lower drum member.

4. The rotary magnetic head drum as set forth in claim 2, wherein said motor is of the iron core type.

5. The rotary magnetic head drum as set forth in claim 2, wherein said rotor magnet is secured to said rotary assembly within said internal cavity by mounting means including an insulated rotor holder and fastening means extending through the latter.

6. The rotary magnetic head drum as set forth in claim 1, wherein said means for transferring signals includes a multi-channel rotary transformer.

7. The rotary magnetic head drum as set forth in claim 6, wherein said rotary transformer includes stationary cores secured in multiple vertical steps to said lower drum member, and rotary cores secured in multiple vertical steps to said rotary assembly opposite to said stationary cores.

8. The rotary magnetic head drum as set forth in claim 7, wherein said stationary cores are secured to an outer peripheral surface of said inner cylindrical portion of said lower drum member.

9. The rotary magnetic head drum as set forth in claim 7, wherein said rotary assembly includes a hub extending about said inner cylindrical portion of the lower drum member, and said rotary cores are secured to an inner peripheral surface of said hub of the rotary assembly.

10. A rotary magnetic head drum for guiding a magnetic tape in a helical-type video tape recorder during the recording or reproducing of signals on the tape, said rotary magnetic head drum comprising:
    a stationary lower drum member having a base portion and inner and outer cylindrical portions extending generally upwardly from said base portion for defining an internal cavity therebetween;
    a rotary assembly rotatably mounted on a rotor shaft coaxial with said lower drum member and having at least one rotary magnetic head mounted thereto for recording signals on and reproducing signals from the magnetic tape;
    driving means for driving said at least one rotary head and being mounted in said internal cavity of the lower drum member; and
    means for detecting rotation of said driving means and being disposed within said internal cavity at least partly in radially spaced, and axially overlapped relation to said driving means to thereby reduce the axial height of the video tape recorder.

11. The rotary magnetic head drum as set forth in claim 10, wherein said driving means includes a motor having a plurality of stator coils fixedly secured to said lower drum member, and a rotor magnet rotatably secured to said rotary assembly inwardly of said stator coils.

12. The rotary magnetic head drum as set forth in claim 11, wherein said stator coils and said rotor magnet are oppositely disposed to each other in the radial direction of said lower drum member.

13. The rotary magnetic head drum as set forth in claim 11, wherein said motor is of the iron core type.

14. The rotary magnetic head drum as set forth in claim 11, wherein said rotor magnet is secured to said rotary assembly within said internal cavity by mounting means including an insulated rotor holder and fastening means extending through the latter.

15. A rotary magnetic head drum for guiding a magnetic tape in a helical-type video recorder during the recording or reproducing of signals on the tape, said rotary magnetic head drum comprising:
    a stationary lower drum member having a base portion and inner and outer cylindrical portions extending generally upwardly from said base portion for defining an internal cavity therebetween;
    a rotary assembly rotatably mounted on a rotor shaft coaxial with said lower drum member and having at least one rotary magnetic head mounted thereto for recording signals on and reproducing signals from the magnetic tape;
    driving means for driving said at least one rotary head and being mounted in said internal cavity of the lower drum member; and
    means for detecting rotation of said driving means and being disposed within said internal cavity at least partly in radially spaced, and axially overlapped relation to said driving means to thereby reduce the axial height of the video tape recorder, said means for detecting including a pattern plate secured to said base portion and having a pole generating FG pattern on its upper surface, adn a polar magnet rotatably mounted on said rotary assembly in axially opposed relation to said pole generating FG pattern.

16. A rotary magnetic head drum for guiding a magnetic tape in a helical-type video tape recorder during the recording and reproducing of signals on the tape, said rotary magnetic head drum comprising:
   a stationary lower drum member having a base portion and inner and outer cylindrical portions extending generally upwardly from said base portion for defining an internal cavity therebetween;
   a rotary assembly rotatably mounted on a rotor shaft coaxial with said lower drum member and having at least one rotary magnetic head mounted thereto for recording the signals on or reproducing the signals from the magnetic tape;
   driving means for driving said at least one rotary head and being mounted in said internal cavity of the lower drum member, said driving means including a motor having a plurality of stator coils fixedly secured to said lower drum member, and a rotor magnet rotatably secured to said rotary assembly;
   means for detecting the rotation of said driving means disposed within said internal cavity and including a pattern plate secured to said base portion and having a pole generating FG pattern on its upper surface, and a polar magnet rotatably mounted on said rotary assembly in axially opposed relation to said pole generating FG pattern; and
   means for transferring signals to and from said at least one rotary head and being also disposed within said internal cavity, said transferring means including a multi-channel rotary transformer having stationary cores secured in multiple vertical steps to said lower drum member, and rotary cores secured in multiple vertical steps to said rotary assembly in radially opposite relation to said stationary cores, with said rotor magnet and said polar magnet being disposed radially outwardly of said rotary cores.

17. A rotary magnetic head drum for guiding a magnetic tape in a helical-type video tape recorder during the recording or reproducing of signals on the tape, said rotary magnetic head drum comprising:
   a stationary lower drum member having a base portion and inner and outer cylindrical portions extending generally upwardly from said base portion for defining a lower internal cavity therebetween;
   a stationary upper drum member having a top portion and an outer flange member depending downwardly from said top portion for defining an upper internal cavity;
   a rotary assembly rotatably mounte don a rotor shaft coaxial with said upper and lower drum members and having at least one rotary magnetic head mounted thereto and extending radially between outer cylindrical portion of the lower drum member and said outer flange member of the upper drum member for recording signals on and reproducing signals from the magnetic tape;
   means for transferring signals to and from said at least one rotary head disposed within said lower internal cavity, said means for transferring including a multi-channel rotary transformer having station ary cores secured in multiple vertical steps to said lwoer drum member and rotary cores secure din multiple vertical steps to said rotary assembly in radially opposite relation to said stationary cores;
   at least one circular circuit board having recording-/reproducing amplifier means mounted thereon and being secured to said rotary assembly within said upper internal cavity;
   driving means for driving said at least one rotary head and being mounted in said lower internal cavity; and
   means also disposed in said lower internal cavity for detecting the rotation of said driving means and including a pattern plate secured to said base portion and having a pole generating FG pattern on its upper surface, and a polar magnet rotatably mounted on said rotary assembly in axially opposed relation to said pole generating FG pattern.

18. The rotary magnetic head drum as set forth in claim 17, wherein said stationary cores are secured to an outer peripheral surface of said inner cylindrical portion of said lower drum member.

19. The rotary magnetic head drum as set forth in claim 17, wherein said rotary assembly includes a hub extending about said inner cylindrical portion of the lower drum member, and said rotary cores are secured to an inner peripheral surface of said hub of the rotary assembly.

20. The rotary magnetic head drum as set forth in 8, wherein said stationary cores are connected to a in said lower drum member, and said rotary cores are d to said at least one magnetic head through said amplifier means mounted on said circuit board.

* * * * *